Oct. 22, 1968   P. SCHMIDT   3,406,864

SEAL FOR PRESSURE VESSELS

Filed Aug. 8, 1966   2 Sheets-Sheet 1

INVENTOR
PAUL SCHMIDT

Nolte and Nolte
Attorneys for
Applicant

Oct. 22, 1968  P. SCHMIDT  3,406,864
SEAL FOR PRESSURE VESSELS
Filed Aug. 8, 1966  2 Sheets-Sheet 2

INVENTOR
PAUL SCHMIDT

United States Patent Office 3,406,864
Patented Oct. 22, 1968

3,406,864
SEAL FOR PRESSURE VESSELS
Paul Schmidt, Fellbach, Germany, assignor to Quanten G.m.b.H. Gesellschaft fur Zerstaubungstechnik, Bad Orb, Germany
Filed Aug. 8, 1966, Ser. No. 571,680
Claims priority, application Germany, Aug. 7, 1965, Sch 37,515
14 Claims. (Cl. 220—46)

ABSTRACT OF THE DISCLOSURE

A cylindrical closure body is freely disposed within a cylindrical pressure vessel to provide a gap therebetween. Within this gap, a sealing ring is moveably arranged in contact with the pressure medium of the vessel, and sealing dispersible material is axially compressed between said sealing ring and a fixedly arranged pressure ring so that resulting tangential stresses against the walls of the gap provide both sealing and fastening of the closure body.

---

The present invention relates in general to a seal for pressure vessels or a connection between pressure vessels or pipes, and in particular to a seal for high pressures.

The constructive designing of high pressure vessels is connected with difficulties especially then, if it is desired to provide a releasable seal. It is, in particular, required to solve the problem of transmitting the locking forces between the lid and the vessel as well as the problem of achieving a sealing between the lid and the vessel. It is known to provide the vessel with a flange, and to secure a lid on the flange. However, such an arrangement is disadvantageous inasmuch as large material quantities are accumulated within the range of the seal, since it is very difficult to achieve and realize a uniform material stress. Moreover, the manufacture of the seal requires a high expenditure in terms of work. The same problem is on hand when connecting parts of a vessel which is under pressure or pipes. It is furthermore known to connect two such parts by screwing same directly or by way of a bushing or socket joint. However, such means of connection are suitable only for very small dimensions.

It is therefore the object of the present invention to overcome the above mentioned shortcomings.

It is a further object of the invention by providing a sealing material with high internal friction. This sealing material is disposed in the free space provided by portions which are telescopically mounted, or, if these portions or parts are abutting, the material is disposed between these parts and a ring or pipe-like element, the latter surrounding the parts on the inner or outer periphery thereof. The material is arranged in the free space in such a way that it is prevented from leaving the same, so that pressure tensions will occur in the material which will result in tangential stresses on account of friction, and that most parts of the sealing forces between the parts or portions which are to be connected will be transmitted by way of these tangential stresses. For transmitting the sealing forces between the lid and the vessel, no longer rigidly-elastical cohesive materials are therefore used, as previously, but rather cohesion-poor materials with high friction or viscosity not only in their inside, but also against the limiting walls. The transmission of sealing forces is thus achieved mainly by way of tangential stresses, and only to a mall extent by way of normal stresses.

This type of a connection offers the advantage that the force-transmitting material engages everywhere completely, so that no stress concentrations will occur. In this way, one achieves a uniform material stress in connection with only low manufacturing precision, and also a reduced material requirement in terms of quantity. Moreover, the cost of the force-transmitting material is very low. Also, no additional sealing force will generally occur.

Fields of application for the present invention are pressure vessels as they are generally used on the sector of high-pressure techniques and by the chemical industry, and in particular in the field of energy technique.

Further features of the invention are explained in the following examples and in particular with respect to the attached drawings in which.

Figure 1:
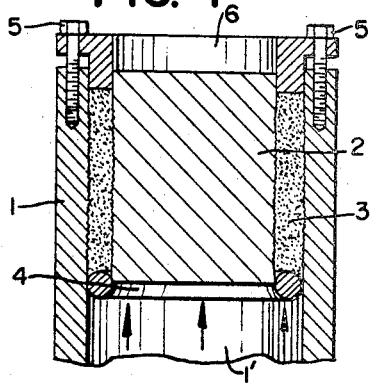
FIG. 1 is a sectional side view of a pressure vessel with a seal according to this invention.

As shown in FIG. 1, the seal according to this invention consists of a cylindrical respectively piston-shaped closure body or lid 2 having a smaller diameter than the inside diameter of a cylindrical pressure vessel 1 wherein the lid 2 is being inserted. A sealing ring 4 is arranged between the bottom base of the lid 2 and the inside wall of the pressure vessel 1 to center the former and to support a dispersible sealing material 3 disposed within the resulting gap in the area of overlapping. The medium within the inner space 1' of the pressure vessel 1 is under pressure and acts from the inside in the direction as marked by arrows on the sealing ring 4 and the base surface of the lid 2. At the same time, a counter-pressure is applied on the dispersible material 3 by means of a pressure ring 6 disposed from above in the gap and being biased in axial direction by tension means 5 in order to insure proper pressure condition of the dispersible material. Due to the pressure of the medium within the pressure vessel 1 the sealing ring 4 seals the gap on the one hand, thus preventing direct contact of the medium with the dispersible sealing material, and compresses the latter between the overlapping walls of the lid 2 and the pressure vessel 1 on the other hand. Consequently, the tangential stresses result therein and constitute predominantly sealing forces in the seal of this invention, whereas axial stress represents but a fraction of these sealing forces. To increase friction between the dispersible material 3 and the inside wall of the vessel 1 and the wall of the lid 2, the latter walls can be roughened up or provided with groovings or very fine threads.

Figure 2:
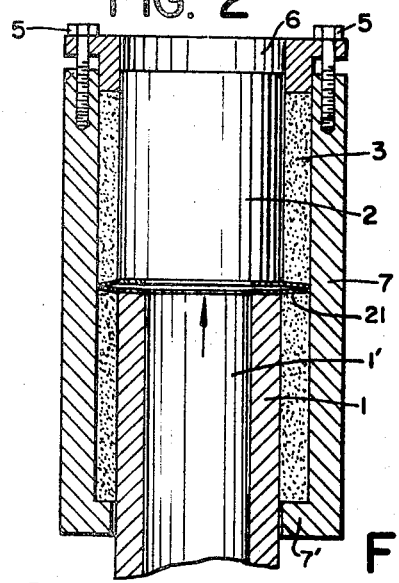
FIG. 2 is a sectional view of another embodiment of this invention.

FIG. 2 shows a cylindrical solid lid 2, the diameter of which is equal to the outside diameter of the pressure vessel 1.

The site of abutting is covered by a ring-shaped element 7 having an increased inside diameter to receive the dispersible material 3, so that the sealing forces can be transmitted, as previously described, from the lid 2 to the vessel 1 by means of the material 3.

The pressure tension, which acts onto the material 3 from the outside, can be applied by way of a pressure ring 6 and also by way of a rigid inner flange which extends or protrudes on the inside similar to the inner flange 7 which is fitted at the bottom of a ring element 7. It is also feasible to provide such a shoulder at the end of the pressure vessel 1.

The inside friction on the material 3 should be as high as possible, and it is therefore preferable to use a dispersed material, for example an inorganic material (such as quartz, corundum, silicon carbide etc.) or a metallic powder. Also organic powders can be used. When placing such dispersed materials, it shoud be secured that same have a high degree of compaction. It may therefore be useful to insert a corresponding prefabricated part consisting of pre-compressed or compact material instead of the dispersed material 3 which will be decomposed under pressure stress when operation is started, and which will thus be transformed into dispersed material. Also the application of a wet suspension, for example of concrete, between the lid and the vessel will yield the desired effect after drying or setting.

For special purposes, one can also use materials with high viscosity, for example bitumen, plastics, and glass at increased temperature, or a metal. However, in such a case, the operating duration of the pressure vessel is limited, since the lid will displace itself as compared or opposite the vessel during the course of time.

For the purpose of releasing the seal, in most cases present pressure ring 6 is removed, and the dispersed material 3 is rinsed either by means of a water jet or by means of compressed air. In the case of a material with high viscosity, same is molten out or chemically dissolved.

Figure 3:
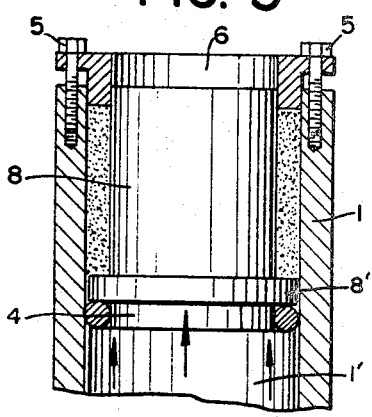
FIG. 3 is a sectional view of the embodiment of FIG. 1 having a modified closure body.
Figure 4:
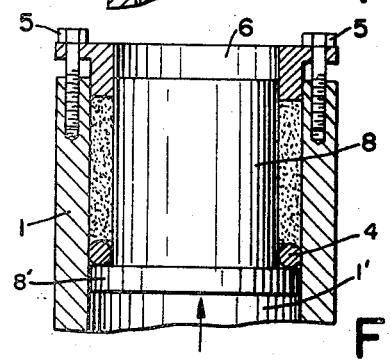
FIG. 4 is the embodiment of FIG. 3 with another position of the sealing ring.

As shown in FIGS. 3 and 4, the lid 2 may also be designed in form of a stepped piston 8 with a seal ring 4 fitted below the flange 8' of the stepped piston (FIG. 3) or with a seal ring 4 fitted above this flange (FIG. 4). Such a design is different from the embodiment according to FIG. 1 inasmuch as the pressure pre-tensioning of the material 3 on the inside is not only determined by the inside pressure, but in addition thereto also by the relation of the diameters on the stepped piston 8.

Figure 5:
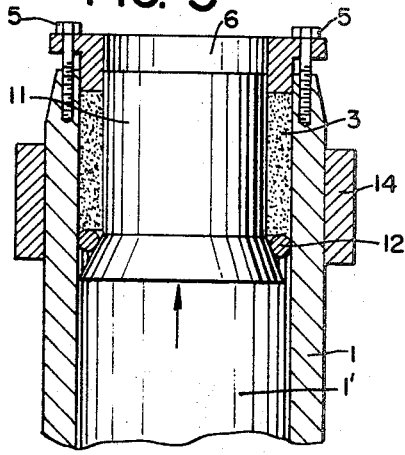
FIG. 5 is another variation of the embodiment of FIG. 4.

FIG. 5 shows a lid 11 with a conical expansion towards the inside of the vessel and seal 12, the latter being preferably a closed metallic ring.

Figure 6:
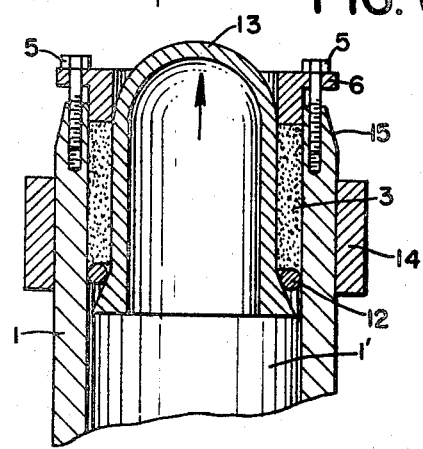
FIG. 6 is a variation of the embodiment of FIG. 5 with a hollow closure body.

In order to achieve a saving of material, a hollow lid 13 can also be used as shown in FIG. 6, same being designed in form of a cylindrical tube with arched and, in particular, ball-shaped bottom. As shown in FIGS. 3 and 6, the pressure vessel may also be fitted with a reinforcing shoulder or a ring 14 within the range of the seal especially then if a stepped piston is used. A slope 15 may also be provided at the end of the pressure vessel.

Figure 7:
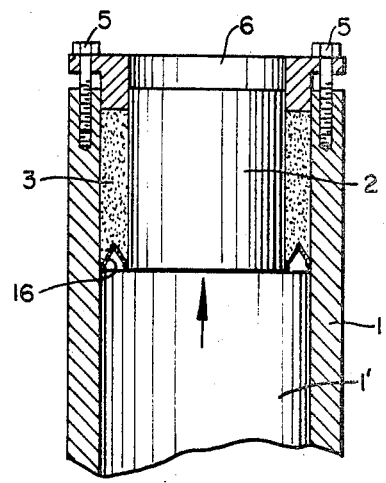
FIG. 7 is a modification of the embodiment of FIG. 1 with a diaphragmatic sealing ring.
Figure 8:
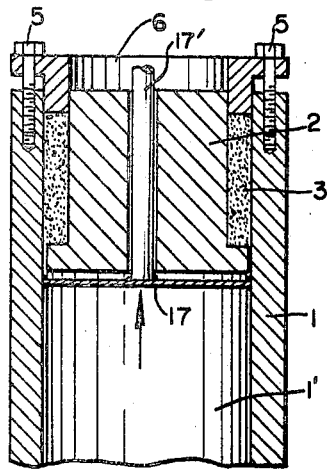
FIG. 8 is another variation having a diaphragmatic sealing disc.

The seals can be designed according to the types of customary groove ring flanges, O-rings, washers or metallic seals. If very high demands are put to the sealing effect, it is recommended to use a diaphragm welded seal 16 above the slot between the lid and the vessel according to FIG. 7, or to fit a disc-shaped diaphragm welded seal 17 covering the entire vessel cross section in accordance with FIG. 8. The latter seal 17 is suspended on a centrally arranged rod 17' tightly passing through an axial bore in the stepped piston lid 8.

A seal can be omitted if the material 3 is of plastic viscosity, or if it dispersed, but of high density and having fine pores, and if slight leakage losses can be accepted.

Figure 9:
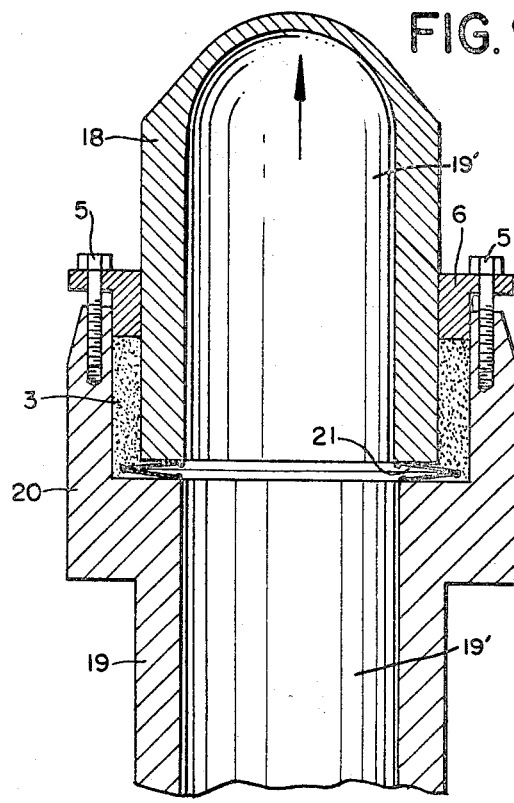
FIG. 9 is still another variation of the embodiment of this invention.
Figure 10:
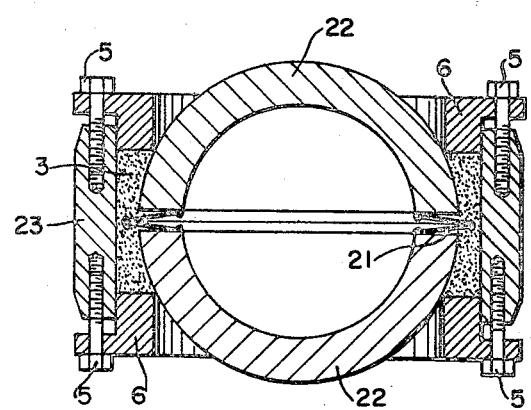
FIG. 10 is a sectional top view of still another embodiment of this invention for sealing two separate semispherical sections of a pressure vessel.

FIG. 9 shows a sealing connection between two cylindrical vessels or pipes 18 and 19 by means of a rigid collar 20. Also in this case, the utilization of a welded diaphragm seal 21 is advantageous. The remainder can be designed according to the aforementioned possibilities, and, if desired, either in form of a stepped piston or with a conical expansion. According to FIG. 10, two semi-spherical cups 22 can also be used instead of two cylindrical containers, same being connected by way of a ring-shaped element 23 and forming thus a ball-shaped container. It is also possible to reverse the combination of the vessels 18 and 19 respectively of the semi-spherical cups 22 with the rigid collar 20 or the ring-shaped element 23.

What is claimed is:

1. A seal for pressure vessels containing a pressure medium, comprising: piston-shaped closure means adapted for closing said vessel and overlapping a wall portion thereof, a gap provided between said closure means and said vessel in the area of overlapping, first sea'ing means movably disposed in said gap to seal the latter and contact said pressure medium, second sealing means of deformable material disposed within said gap in abutment with said first sealing means; and counter-pressure means firmly arranged at said gap in abutment with said second sealing means so that a pressure and counter-pressure exerted upon the latter results in tangential stress between the wall portions of the vessel and said closure means.

2. The seal as claimed in claim 1 wherein said closure means are telescopically arranged within said vessel, said sealing and pressing means being provided therebetween.

3. The seal as claimed in claim 1 wherein said closure means include an annular member disposed telescopically around an outer wall portion of said vessel to provide an annular gap therebetween, said gap containing said second sealing means, whereas said first sealing means is a ring-shaped diaphragm arranged between said vessel and said annular member.

4. The seal as claimed in claim 1 wherein said second sealing means consists substantially of a disperse substance having increased internal friction.

5. The seal as claimed in claim 4 wherein said first sealing means is a rigid annular ring preventing said second sealing means from flowing out of said gap.

6. The seal as claimed in claim 2 wherein said pressure vessel and said closure means are substantially cylindrical.

7. The seal as claimed in claim 6 wherein said closure means is a hollow cylindrical body having a convex shaped base.

8. The seal as claimed in claim 6, wherein said closure means and said vessel are formed substantially semi-spherical whereby said first sealing means is disposed therebetween.

9. The seal as claimed in claim 6 wherein said vessel is provided with a reinforcing collar mounted around the outer periphery of said vessel in the area of overlapping thereof by said closure means.

10. The seal as claimed in claim 1 wherein the walls of said vessel and closure means are roughened in the area of overlapping thereof to improve the adhesion of said second sealing means engaging said wall.

11. The seal as claimed in claim 6, wherein said closure means is arranged substantially in form of a differential piston, a shoulder being provided on the lower end of said piston which extends into said vessel, said shoulder being disposed substantially around the periphery of said piston.

12. The seal as claimed in claim 11, wherein said closure means is provided with a conical expansion extending into said vessel.

13. The seal as claimed in claim 1, wherein said first sealing means consists substantially of a welded diaphragm seal.

14. The seal as claimed in claim 2, wherein the walls of said vessel comprise a conical tapering in the range of said closure means extending to the lower portion of said vessel.

References Cited

UNITED STATES PATENTS 3,182,850   5/1965   Bennett.

JAMES B. MARBERT, *Primary Examiner.*